March 1, 1960 R. H. BILLS 2,926,593
NEGATIVE RETOUCHING BOX
Filed March 17, 1958 3 Sheets-Sheet 2

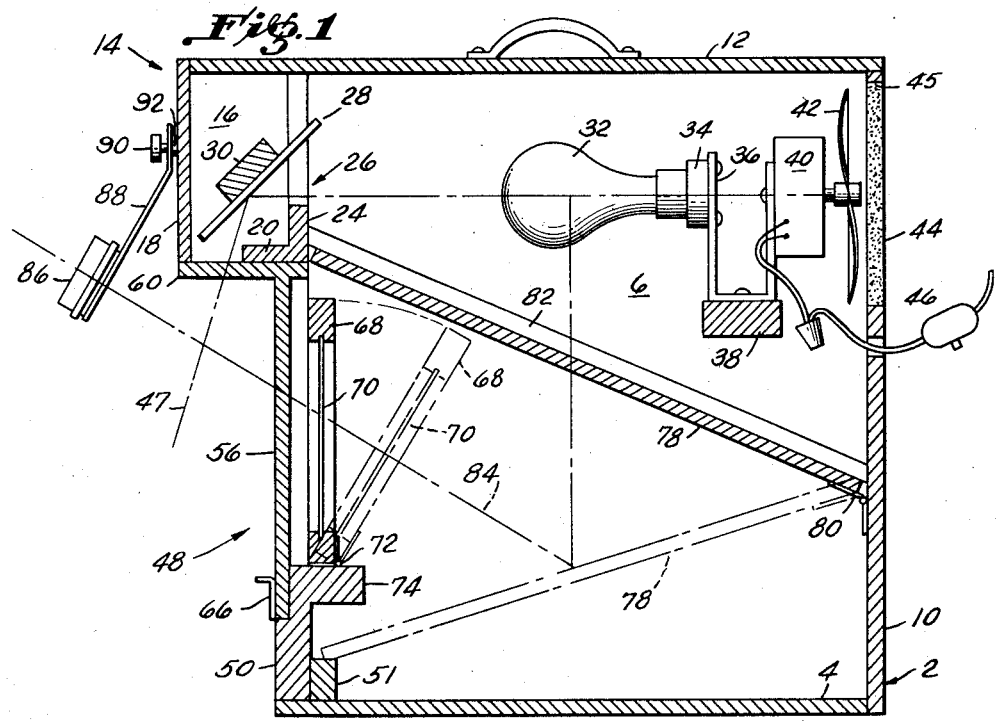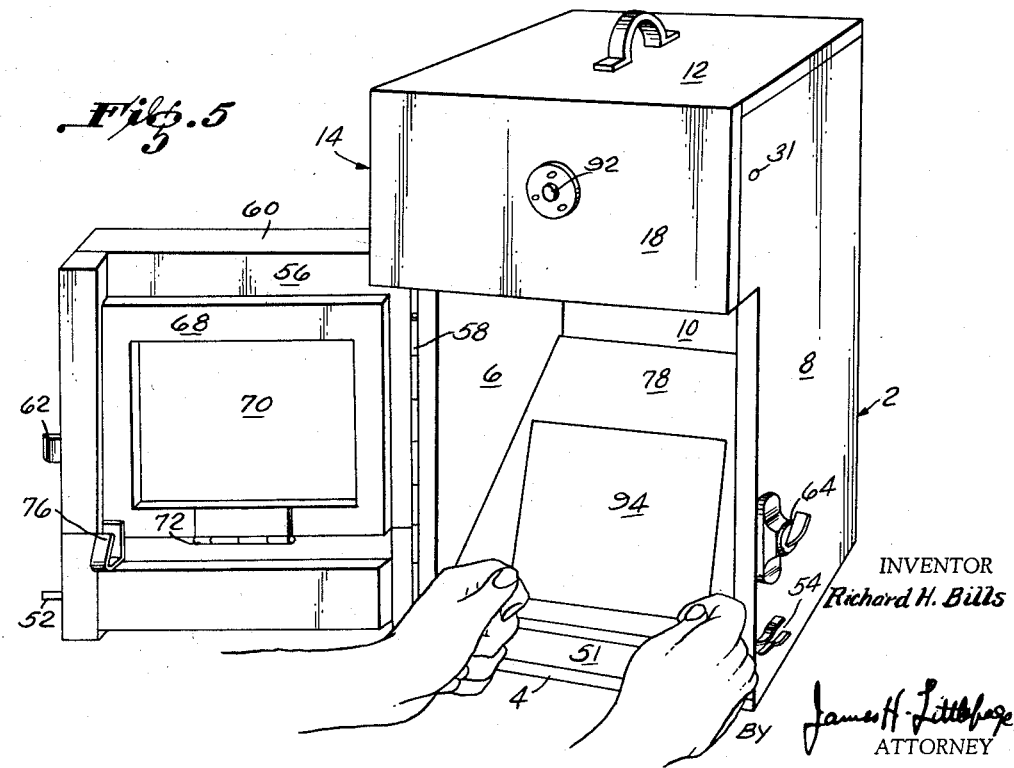

INVENTOR
Richard H. Bills

BY James H. Littlepage
ATTORNEY

March 1, 1960

R. H. BILLS 2,926,593

NEGATIVE RETOUCHING BOX

Filed March 17, 1958

INVENTOR.
Richard H. Bills
BY James H. Littlepage

United States Patent Office 2,926,593
Patented Mar. 1, 1960

2,926,593

NEGATIVE RETOUCHING BOX

Richard H. Bills, West Bend, Wis.

Application March 17, 1958, Serial No. 721,999

8 Claims. (Cl. 95—102)

This invention relates to photography and, more particularly, to a retouching box for inspecting, dusting and retouching negatives.

The object of the invention is to provide a retouching box wherein a negative may be examined under light from different angles for detecting and eliminating surface defects, and for inspecting the photographic content of the negative. More specifically, it is intended now to provide a combined light source, air filter and fan, and a reflective system arranged so that when a negative is supported at an inspecting station, a relatively intense beam of light is projected obliquely across the negative to provide texture lighting, whereby the smallest visible dust particle or surface lump will appear in bold relief. A slight breeze of filtered air is also directed across the negative surface so that, as the negative is lightly dusted, foreign matter on the surface is wafted away.

A further object of the invention is to provide a negative support and alternate lighting arrangement which may be set for holding the negative at an inclination best suited for retouching while projecting diffused, relatively soft light through the negative from the back thereof in a direction substantially normal to the plane of the negative. It is intended also to provide a support for a magnifying glass disposed so that the negative, in this retouching position, may be minutely scrutinized.

Yet another object is to provide for inspecting the negative against a white background to see the results of the retouching, and so that the picture-producing properties can be gauged.

It is particularly intended that the negative be bathed, during all phases of dusting, retouching and inspection, with dust-free air gently streaming from within the box outwardly towards the operator, not only to remove dust from the negative, but also to safeguard the negative, as well as the box itself, against dust contamination during the entire operation. A final object is to provide for the rapid shifting, back and forth if necessary, between the box set-ups for surface inspection and dusting, retouching, and final inspection.

These and other objects will be apparent from the following specification and drawings, in which:

Fig. 1 is a vertical section taken midway through the box, showing alternate positions of the negative retouching holder and the trap door in dotted lines;

Fig. 5 shows the box set-up for final inspection.

Figure 2:
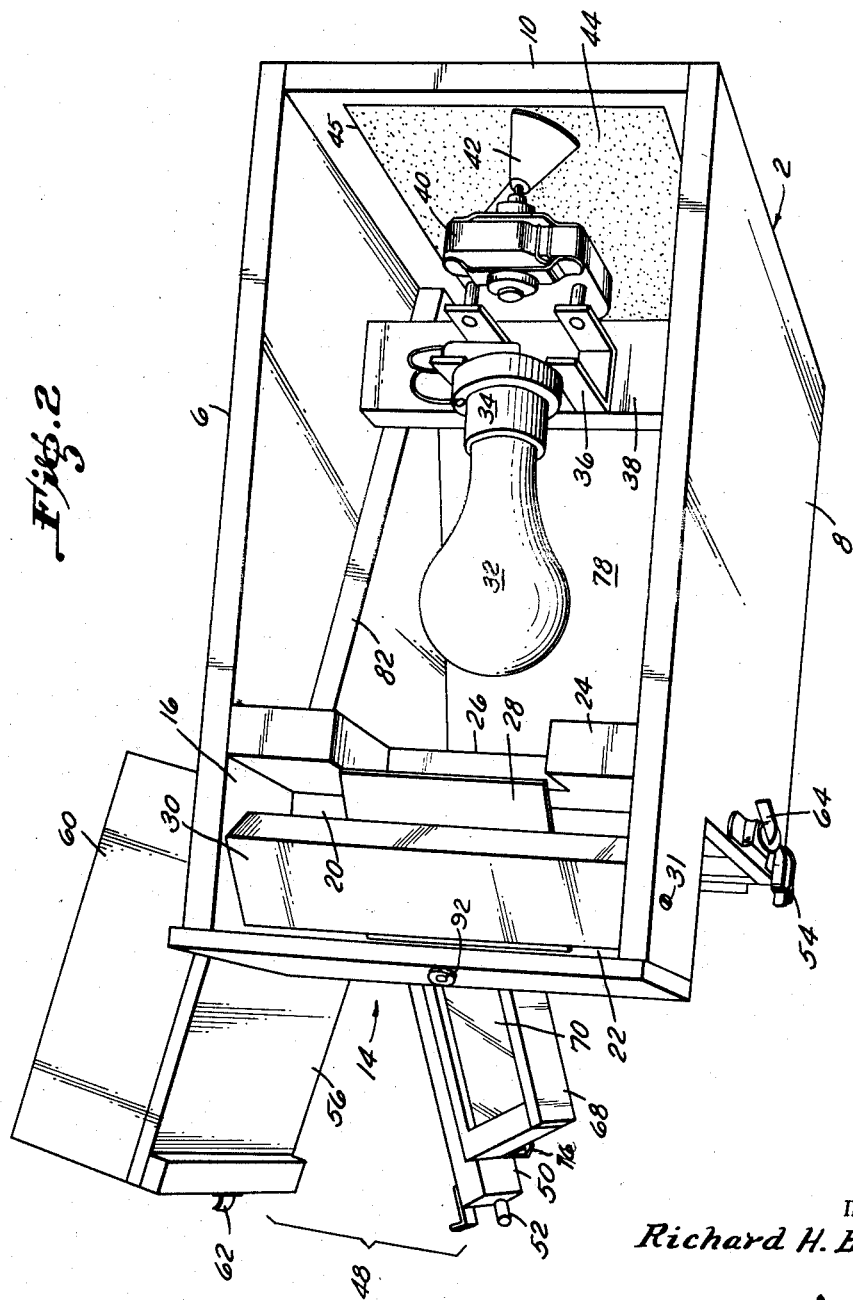
Fig. 2 is a plan view of the box, with top removed, showing the trap door in its lower position, and showing the outer front door completely open and the negative carrier door partly open.

Referring first to Figs. 1 and 2 of the drawings, in which like reference numerals denote similar elements, the negative retouching box 2 is formed of a bottom wall 4, side walls 6 and 8, a rear wall 10 and a top wall 12, all joined in a rigid light tight manner. The front of the box, generally indicated at 14, is provided with an over-hanging alcove 16 (Figs. 1 and 2) and a relatively short front wall 18. A horizontal ledge 20 extending between side walls 6 and 8 is spaced rearwardly from the lower edge of front wall 18 to provide a downwardly opening slit 22, and a vertical partition 24 extending across the upper interior of the box at the rear edge of horizontal ledge 20 has a central opening 26. A mirror 28 is supported within the interior of overhanging alcove 16 and is adjustably supported by a cross strip 30 whose ends are held by screw pintles 31 extending through side walls 6 and 8, so that the angle of the mirror may be adjusted about a horizontal axis for reflecting light at the desired angle through silt 22.

Mounted within the upper rear portion of the interior of box 2 is a lamp 32 whose socket 34 is supported on a bracket 36 mounted on a cross strip 38. Also mounted on bracket 36, behind lamp 32, is an electric fan motor 40 which drives fan blades 42 so as to draw in a stream of air through a filter 44 which extends across a filter opening 45 in the upper rear portion of the rear wall 10. An electric cord 46 with suitable switch control is provided for energizing the lamp 32 and fan motor 40. Light from lamp 32 is reflected by mirror 28 through slit 22 downwardly and forwardly in the direction indicated by broken line 47 when upper door 56, detailed hereinafter, is open. Air drawn in through filter 44 by fan 42 is also deflected by mirror 28 downwardly through slit 22 when upper door 56 is open and trap door 78, described below, is in its upper position.

The front door assembly generally indicated at 48 consists of a lower door piece 50 pivoted at one end to the lower front edge of side wall 6 and, when closed, engaging against a fixed baffle strip 51. Lower door piece 50 is normally held closed by a bolt 52 engaging a spring catch 54 on side wall 8. The front door assembly 48 also includes an upper door 56 hinged at 58 to side wall 6 and provided at its upper end with a forwardly extending horizontal flange 60 which engages beneath horizontal ledge 20 and, when upper door 56 is closed, horizontal flange 60 also closes slit 22. Upper door 56 may be held closed by a hook 62 on its free edge engageable by a latch 64 on side wall 8. Upper door 56 may also be connected by a catch 66 to lower door piece 50 so that the two swing together.

A negative holder frame 68 carrying a negative retouching glass 70 is pivoted at 72 along its lower edge to a strip 74 affixed to the upper rear side of lower door piece 50. Negative holder frame 68 is normally held upwardly in its vertical full line position as shown in Fig. 1 by a stop arm 76. However, when stop arm 76 is pivoted 180°, negative holder frame 68 can be swung downwardly to the dotted line position shown in Fig. 1, this latter being the normal position of use for retouching.

As seen best in Figs. 1, 2 and 5, a partition in the form of a trap door 78 is pivoted at 80 to rear wall 10. Trap door 78 has two normal positions of use, the upper one being shown in full lines in Fig. 1 wherein it rests against baffle strips 82 where it is so held by a suitable latch, not shown, so as to exclude the light and air from lamp 32 and fan 42 from the lower portion of the interior of the box. In its lower position shown in Fig. 5 and in dotted lines in Fig. 1, trap door 78 is inclined downwardly and forwardly and rests against baffle strip 51. The upper surface of trap door 78 is white and the direction of the light from lamp 32 reflected by the white upper surface of trap door 78 is upwardly and forwardly, as indicated by the broken line 84, this direction being substantially normal to the plane of negative retouching glass 70 when negative holder frame 68 is inclined downwardly and rearwardly to its dotted line position. All other inside surfaces are painted flat black.

Figure 4:
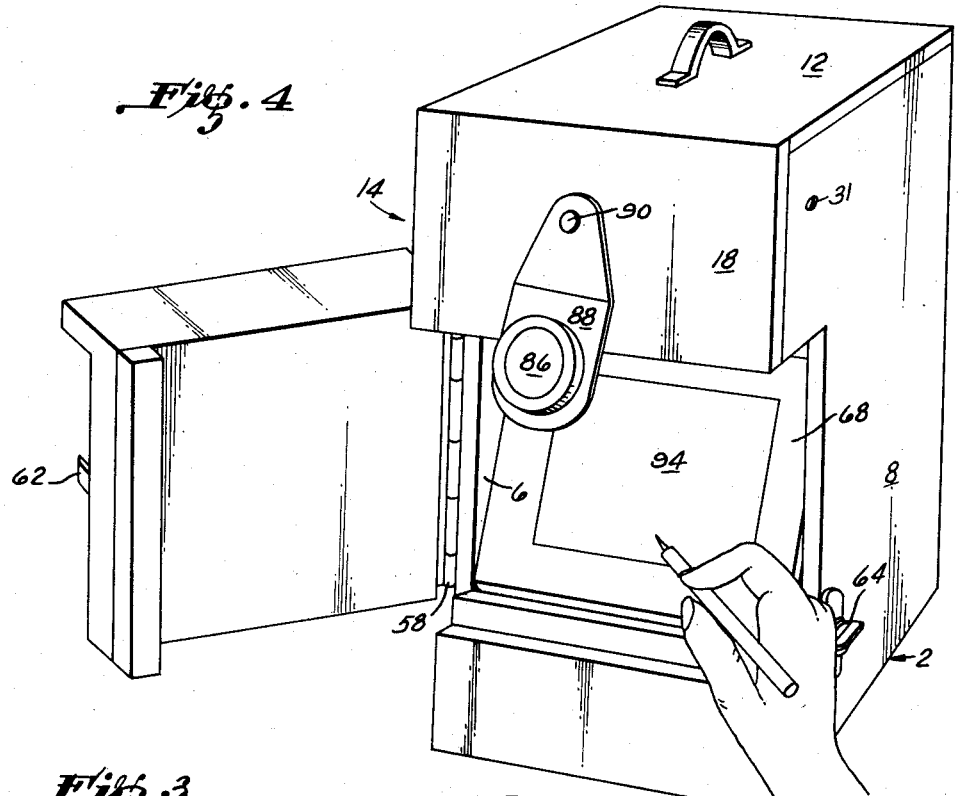
Fig. 4 shows the box set-up for retouching.

A magnifying glass 86 of 8" focal length is removably held on front wall 18 by a bracket 88 and thumb screw 90 engaging in a socket 92 so that, in its normal position of use, the axis of magnifying glass 86 is towards negative retouching glass 70 when the latter is inclined downwardly and rearwardly as shown in Fig. 4.

Figure 3:
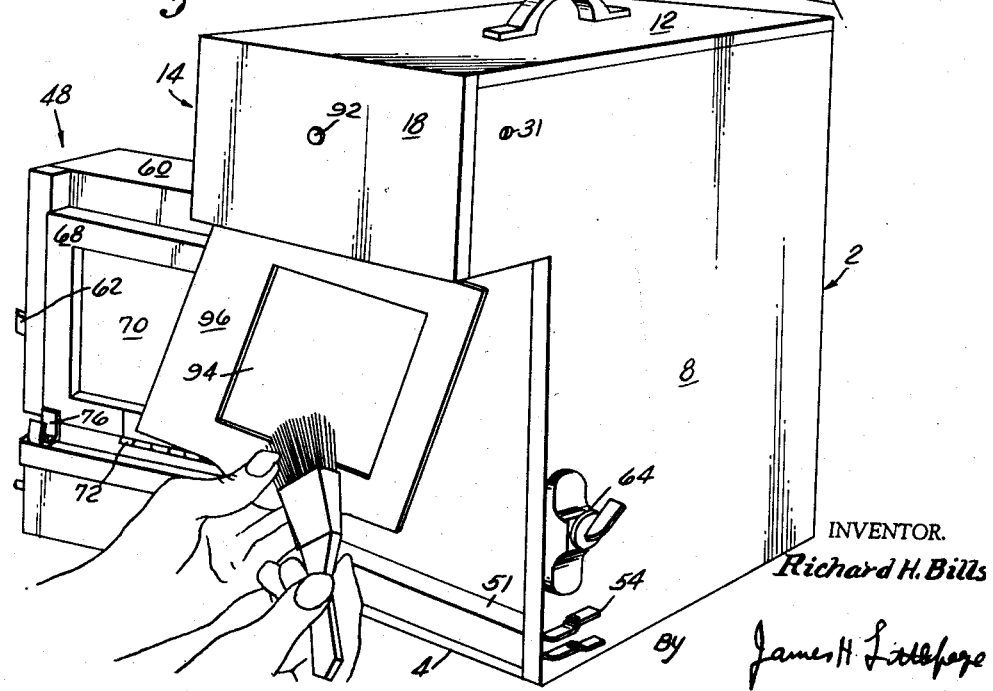
Fig. 3 shows the box set-up for surface inspection and dusting of a negative.

In a typical cycle of operation, trap door 78 is initially latched in its upper, full line position so as to exclude light and air from the lower portion of the box interior, and the front door assembly 48 is swung open as shown in Fig. 3. A negative 94 mounted in a negative holder 96 is held beneath horizontal ledge 20 so that the surface of the negative is almost parallel with the direction of light, as indicated at 47 in Fig. 1, reflected by mirror 28 through slit 22. The light, cast at an oblique angle across the surface of the negative, shows up dust particles or foreign matter on the surface of the negative so that they may be detected and brushed off. The air issuing downwardly through slit 22 carries off the dusted particles and protects the negative against ambient dust in the air around the box.

For retouching the negative, trap door 78 is swung to its lower position, stop arm 76 is swung 180°, negative 94 is mounted on negative retouching glass 70, frame 68 is inclined rearwardly to the position shown in Fig. 4 and in dotted lines in Fig. 1, lower door piece 50 is latched closed, and magnifying glass 86 is mounted. The light from lamp 32 reflected by the white upper surface of trap door 78 passes through the negative retouching glass and negative in the direction indicated at 84 in Fig. 1. While looking through magnifying glass 86, the operator may perform delicate retouching operations. When retouching has been completed, the entire front door assembly 48 is swung open as shown in Fig. 5 and the negative is inspected by placing it against the upper white surface of trap door 78.

The invention is not limited to the details illustrated and described hereinbefore, but is intended to cover all substitutions, modifications and equivalents within the scope of the following claims.

I claim:

1. A negative retouching box comprising bottom, top, rear and side walls and an opening in the front thereof, said side and top walls projecting forwardly above said front opening and providing an overhanging extension of said box above said front opening, means providing an aperture through the lower side of said extension, a source of illumination in the upper portion of said box, means in said extension for directing light from said source downwardly through said aperture whereby said downwardly directed light sweeps substantially obliquely across the front of said opening, a partition pivoted along its rear edge to the rear wall below said source and being swingable between a first position in which the same extends from adjacent the top of the front opening to the rear of the box whereby egress of said light through the front opening is blocked, and a second position in which the same extends from adjacent the lower edge of the front opening to the rear of the box, whereby egress of light from said source through said front opening is permitted, a negative support, means for mounting said support across said front opening, said box having an air-filtered opening in the upper portion thereof, and an electric fan in said upper portion for drawing air inwardly through said filtered opening, whereby filtered air may issue from said upper portion outwardly through said aperture and said front opening.

2. The combination claimed in claim 1, said partition having a light reflective upper surface and, when in said second position, reflecting light from said source primarily upwardly and outwardly through said front opening.

3. The combination claimed in claim 2, the means for mounting the negative across said front opening being tiltable so as to dispose the plane of the negative substantially at right angles to the direction of light reflected by said partition.

4. A negative retouching box comprising bottom, top, rear and side walls and an opening in the front thereof, said side and top walls projecting forwardly above said front opening and providing an overhanging extension of said box above said front opening, means providing an aperture through the lower side of said extension, a source of illumination in the upper portion of said box, means in said extension for directing light from said source downwardly through said aperture whereby said downwardly directed light sweeps substantially obliquely across the front of said opening, a partition pivoted along its rear edge to the rear wall below said source and being swingable between a pivot position in which the same extends from adjacent the top of the front opening to the rear of the box whereby egress of said light through the front opening is blocked, and a second position in which the same extends from adjacent the lower edge of the front opening to the rear of the box, whereby egress of light from said source through said front opening is permitted, a door assembly for said front opening, said assembly including a first door section pivoted to said box adjacent said front opening, a negative support on said first door section and adapted, in the closed position of the first door portion, to support a negative within said opening, and a second door section, said second section having portions thereon for respectively closing said opening and said aperture.

5. A negative retouching box comprising bottom, top, rear and side walls and an opening in the front thereof, said side and top walls projecting forwardly above said front opening and providing an overhanging extension of said box above said front opening, means providing an aperture through the lower side of said extension, a source of illumination in the upper portion of said box, means in said extension for directing light from said source downwardly through said aperture whereby said downwardly directed light sweeps substantially obliquely across the front of said opening, a partition pivoted along its rear edge to the rear wall below said source and being swingable between a first position in which the same extends from adjacent the top of the front opening to the rear of the box whereby egress of said light through the front opening is blocked, and a second position in which the same extends from adjacent the lower edge of the front opening to the rear of the box, whereby egress of light from said source through said front opening is permitted, said box having an air-filtered opening in the upper portion thereof, and an electric fan in said upper portion for drawing air inwardly through said filtered opening, whereby filtered air may issue from said upper portion outwardly through said aperture and said front opening.

6. A negative retouching box comprising bottom, top, rear and side walls and an opening in the front thereof, said side and top walls projecting forwardly above said front opening and providing an overhanging extension of said box above said front opening, means providing an aperture through the lower side of said extension, a source of illumination in the upper portion of said box, an adjustable mirror in said extension for reflecting light from said source downwardly through said aperture whereby said downwardly directed light sweeps substantially obliquely across the front of said opening, a partition having a white upper surface, said partition having pivoted along its rear edge to the rear wall below said source and being swingable between a first position in which the same extends from adjacent the top of the front opening to the rear of the box whereby egress of said light through the front opening is blocked, and a second position in which the same extends from adjacent the lower edge of the front opening to the rear of the box, whereby egress of light from said source reflected by said white upper surface through said front opening is permitted, a negative support, and means for mounting said support across said front opening.

7. In a negative retouching box, means providing an enclosure having a front opening, a source of illumination disposed in the upper portion of said enclosure, a partition in said enclosure below said source, said partition being mounted for movement between a first position in which said partition extends across the interior of said enclosure from the upper edge of said front opening to the rear of said enclosure and constitutes a shutter for blocking the transmission of light from said source to the lower portion of said box behind said front opening and a second position in which said partition extends across said interior from the lower edge of the front opening to said rear, a negative support mounted across said front opening, the upper surface of said partition being substantially white and providing a background surface for inspecting a negative disposed adjacent thereto and further providing a light reflective surface for reflecting light through a negative in said negative support when the latter is disposed across said opening and means for directing light from said source obliquely across the front of said box.

8. In a negative retouching box, means providing an enclosure having a front opening, a source of illumination disposed in the upper portion of said enclosure, a partition in said enclosure below said source, said partition being mounted for movement between a first position in which said partition extends across the interior of said enclosure from the upper edge of said front opening to the rear of said enclosure and constitutes a shutter for blocking the transmission of light from said source to the portion of said box behind said front opening and a second position in which said partition extends across said interior from the lower edge of the front opening diagonally upward to said rear of said enclosure and exposes the portion of said box behind the front opening to said source of illumination, a negative support mounted across said front opening, and means for directing light from said source obliquely across the front of said box.

References Cited in the file of this patent

UNITED STATES PATENTS

| | | |
|---|---|---|
| 2,479,008 | Highfield | Aug. 16, 1949 |
| 2,748,649 | Orlando | June 5, 1956 |

FOREIGN PATENTS

| | | |
|---|---|---|
| 604,786 | Germany | Oct. 30, 1944 |